United States Patent [19] [11] 3,758,762
Littman et al. [45] Sept. 11, 1973

[54] DECOUPLED FEEDFORWARD-FEEDBACK CONTROL SYSTEM

[75] Inventors: Bernard Littman, Philadelphia; Charles W. Ross, Hatboro, both of Pa.

[73] Assignee: Leeds & Northrup Company, Philadelphia, Pa.

[22] Filed: July 10, 1972

[21] Appl. No.: 270,419

[52] U.S. Cl. ............ 235/150.1, 60/108/9, 318/561
[51] Int. Cl. .... G05b 13/02, G05b 17/02, G05d 7/06
[58] Field of Search ................................ 235/150.1

[56] References Cited
UNITED STATES PATENTS
3,601,588 8/1971 Bristol............................. 235/150.1

Primary Examiner—Eugene G. Botz
Attorney—William G. Miller, Jr. and Raymond F. MacKay et al

[57] ABSTRACT

A control system combining feedforward and feedback control of a manipulated variable of a process is arranged to provide a modification of the error signal to which the feedback control responds so as to effect a decoupling of the feedforward and feedback control actions. The error signal is diminished by a signal of magnitude sufficient to minimize or reduce by a predetermined amount the response by the feedback control to action by the feedforward control as reflected in changes in the controlled variable. Provision is also made to avoid unnecessary feedback control in response to set point changes when feedforward action is provided from the set point changes.

21 Claims, 6 Drawing Figures

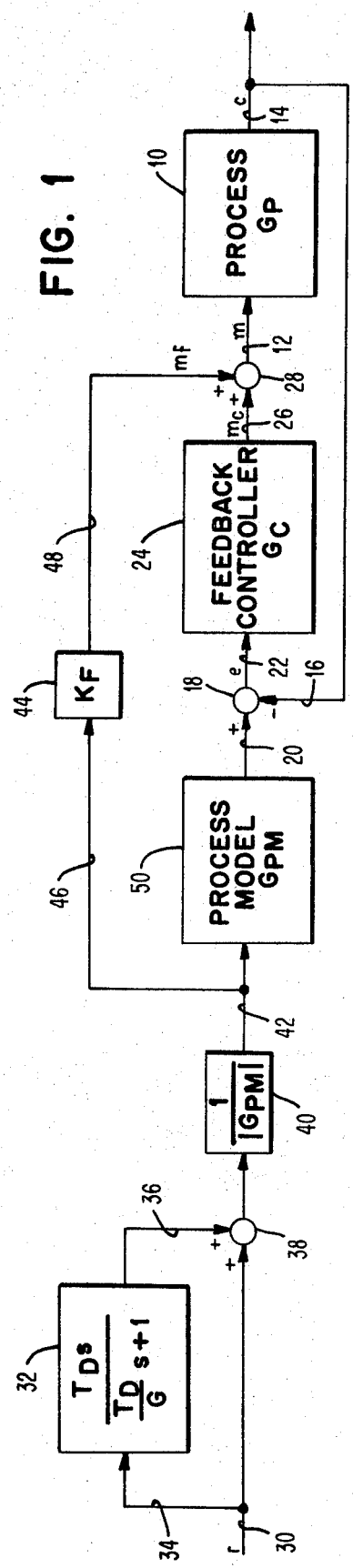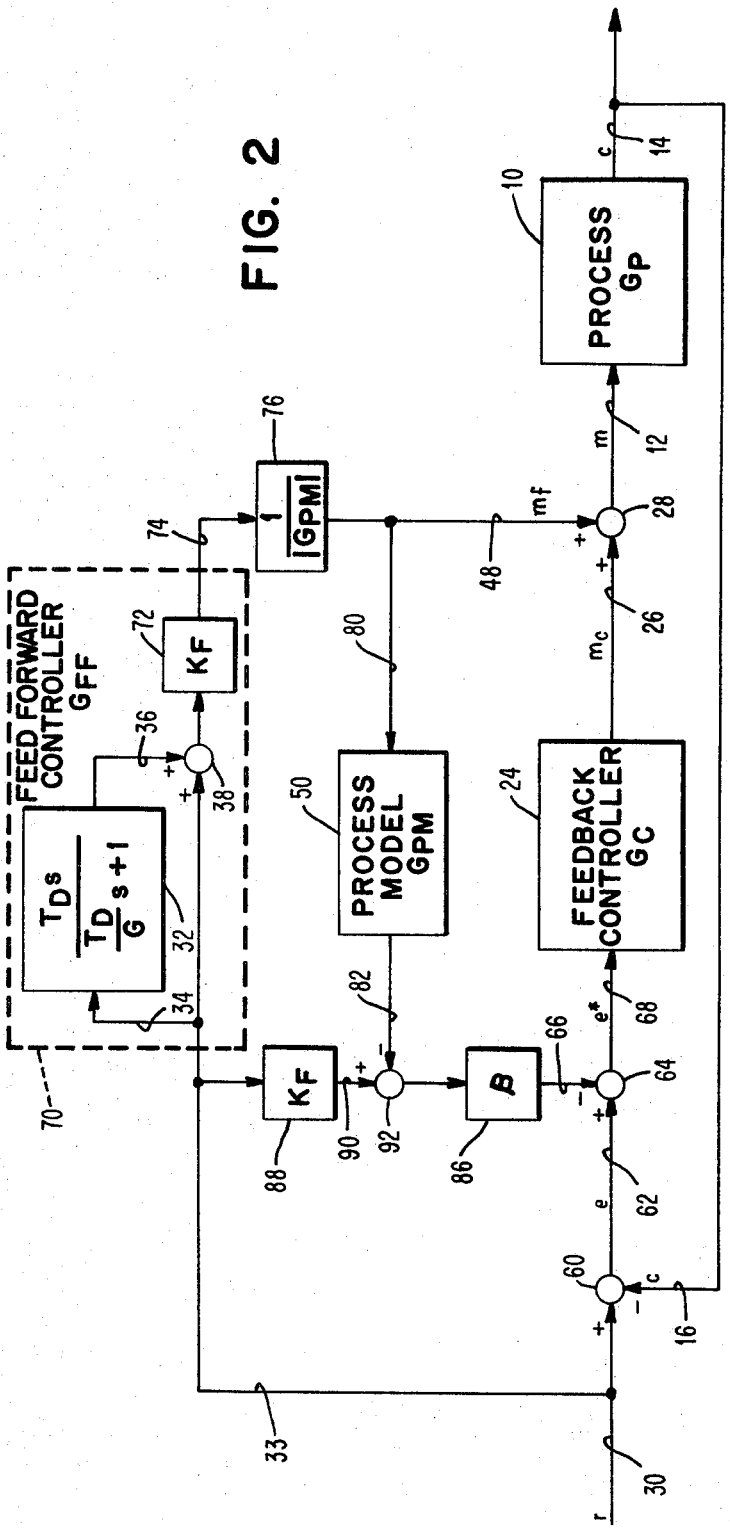

DECOUPLED FEEDFORWARD-FEEDBACK CONTROL SYSTEM

BACKGROUND OF THE INVENTION

In many control systems it has been proven advantageous to utilize a feedforward control in addition to the conventional feedback control system for the purpose of improving the overall control performance. For the purposes of this description, feedforward control action may be defined as the control action in which information concerning either a controller set point or a demand signal is converted into corrective action on the manipulated variable to minimize deviations of the controlled variable from the set point. A demand signal may be defined as the representation of a process related variable which affects the controlled variable in a predictable manner. In applications involving a single feedback control loop, for example, a feedforward control signal derived from a process condition such as the set point signal may be used to provide improved response to changes in set point. The feedforward signal would conventionally modify the manipulated variable of the control system by providing proportional and/or derivative control response.

In control systems in which both feedforward and feedback control action is required it has been found that the combination of those two control actions may either lead to an excessive control action or require compromises in the tuning of the control system to prevent excessive control action. It is normally desirable to tune the feedback controller for optimum response to disturbances in the system being controlled and at the same time it is desirable that the feedforward control action be independently tuned for optimum response to changes in demand or set point. Tunings for optimum response for both the feedforward and feedback control actions have, however, as pointed out, been found to be difficult to obtain because of the coupling between the feedforward and feedback control systems.

It is an object of this invention to provide a means for decoupling the feedforward and feedback control systems so that each may be tuned for optimum response.

SUMMARY OF THE INVENTION

In carrying out this invention there is provided a method for controlling a variable of a process to a set point by automatically modifying by feedback control action a manipulated variable of the process to reduce the effective error between the controlled variable and the set point toward zero while automatically modifying by feedforward control action the manipulated variable of the process in accordance with the change of a process condition and to allow optimum tuning of the feedforward and feedback control action. There is utilized an automatic modification of the effective error signal so as to prevent a change in the effective error signal in response to the feedforward portion of the signal to which the feedforward control action responds. In carrying out such a control method where the control system has means for providing feedforward and feedback control action this invention provides the improvement which comprises means for modifying the effective error signal so as to prevent a change in the effective error signal in response to changes in that signal to which the feedforward control action responds.

BRIEF DESCRIPTION OF THE DRAWINGS

In the drawings in which like reference characters identify like elements:

FIG. 1 is a block diagram of a feedforward-feedback control system involving a single control loop.

FIG. 2 is a block diagram of a feedforward-feedback control system showing a modification of the system of FIG. 1.

DESCRIPTION OF THE PREFERRED EMBODIMENTS

Figure 3:
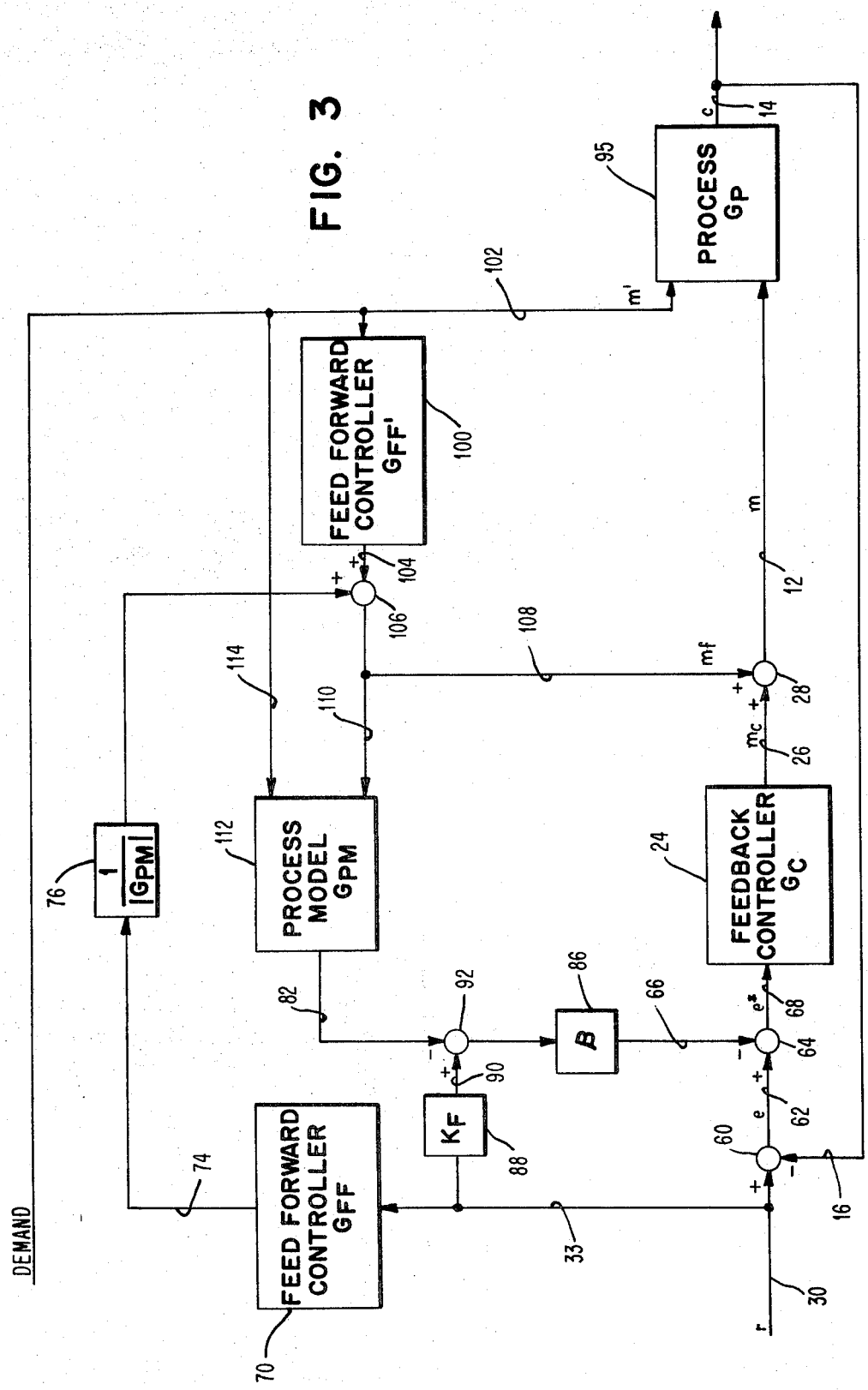
FIG. 3 is a block diagram of a feedforward-feedback control system showing feedforward control action from the set point as shown in FIG. 2 with the addition of feedforward control action from a separate demand signal.

FIG. 1 shows a system for controlling the process identified as block 10 which has a transfer function $G_P$ by modifying the manipulated variable $m$ shown as a signal on the line 12 into the process 10 in order to maintain at a set point the controlled variable $c$. The variable $c$ may be measured to provide a signal on line 14 indicative of the value of that variable of the process. As in the normal feedback control loop the value of the controlled variable $c$ is introduced by way of line 16 to subtractor 18 where it is compared with a value which acts as a set point and which appears in the form of a signal on line 20 as another input to the subtractor 18. The deviation between the controlled variable appearing on line 16 and the set point signal appearing on line 20 appears in the form of an error signal on output line 22 from subtractor 18. That error signal is then the effective error signal to which the feedback controller 24 responds. Controller 24 is shown as having a transfer function $G_C$. The feedback controller may be any of a number of well known feedback controllers and may, for example, provide proportional, derivative and integral response to the error signal. Such response will change the manipulated variable by modifying the signal $m_c$ on line 26 which will in turn modify the signal on line 12, since the signal $m_c$ on line 26 is introduced as an input to the summer 28 whose output on line 12 is the signal $m$ representing the manipulated variable. For convenience $m_f$, $m_c$ and $m$ may be referred to as manipulated variables.

In FIG. 1 there is provided a set point signal $r$ on line 30 which signal may be modified to change the set point for the process 10. When the set point 30 is subject to changes it is desirable to provide feedforward control action from that change to the process to improve the response of the overall control system. The feedforward control action shown in FIG. 1 involves summation of the set point signal $r$ and a signal derived from that set point signal as modified by the dynamics of the feedforward control action which are introduced by means of the apparatus of block 32. The block 32 is designed to utilize as an input the signal $r$ on line 34 as it is derived from line 30 to provide on its output line 36 a signal relating to the input in accordance with the Laplace transform $$\frac{T_D s}{\frac{T_D}{G}s+1}$$

which in effect provides on line 36 a lagged derivative signal, or in other words, a lagged rate signal so that the feedforward control action will be proportional to the rate of change of the set point with that signal being lagged by a predetermined amount. The signals on lines 30 and 36 are summed at the summer 38 to provide an input to block 40 where the results of the summation are multiplied by the reciprocal of the gain of the process model $1/|G_{PM}|$, the product appearing as a signal on output line 42 from block 40. The symbol $|G_{PM}|$ is used to represent steady state gain of the transfer function $G_{PM}$.

The signal from line 42 is then introduced as a feedforward control action modifying the manipulated variable $m$ by adding to the manipulated variable $m_c$ appearing on line 26 as a signal, $m_f$, which is determined by modifying the signal on line 42 by a constant $K_F$, which multiplication is carried out in block 44. Thus, the input to block 44 from line 42 which appears on line 46 is multiplied by a proportional gain $K_F$ in block 44 to provide on its output line 48 the signal $m_f$.

The signal from line 42 is also introduced as an input to process model 50 which is shown as having a transfer function $G_{PM}$ which then provides its output on line 20. The process model 50 is desirably a circuit which is designed to model the process 10 as closely as is practicable with the output representing a total signal as compared with an increment as would be obtained from a linearized model. The development of such process models is an art well known and therefore needs no further explanation.

In decoupling the feedback and feedforward control actions of the system in FIG. 1 it is desirable that there should not be any change in the error signal $e$ in response to a change in the set point $r$. To accomplish that decoupling, the effect on the controlled variable $c$ of the feedforward control action is canceled. Thus, as modification of the signal $m_f$ changes the controlled variable $c$, that effect is canceled at the subtractor 18 by the change in the signal on line 20. The signal on line 20 is tailored by the process model 50 to respond to changes in the signal on line 42, representing the feedforward control action, in the same way as that feedforward control action affects the controlled variable $c$. The cancellation of the changes in the signal on line 16 due to feedforward control action by changes in the signal on line 20 assumes that the proportional gain $K_F$ introduced by block 44 has a value of one. When the value of $K_F$ is less than one then instead of the change in signal on line 16 being canceled by a change in signal on line 20, the change on line 20 exceeds the change on line 16 creating a change in the error on line 22 which is eventually reduced by the feedback control action.

As is the usual case the changes in the controlled variable $c$ resulting from disturbances to the process are corrected by the operation of the feedback controller to change the signal $m_c$ on line 26 until the resulting change in $m$ causes the signal $c$ on line 16 to come to equality with the signal on line 20.

It will be evident that in the steady state condition the signal on line 20 will be $r$ and hence the process will be controlled to cause $c$ to equal $r$.

In FIG. 2 there is shown another system for providing a combination of feedforward and feedback control action with the novel decoupling system. This system differs in several respects from the system of FIG. 1, particularly in that the coefficient $\beta$ is introduced. As shown in FIG. 1 the process 10 has its manipulated variable modified by the signal $m$ on line 12 so as to maintain through the operation of the feedback controller 24 a value for the controlled variable $c$ corresponding with the set point signal $r$. As shown in FIG. 2, the controlled variable $c$ is introduced by way of line 16 to a subtractor 60 which compares the set point $r$ and and the controlled variable $c$ and provides an output signal on line 62 representative of the error $e$, or in other words, the deviation of the controlled variable from the set point. The error signal $e$ is then modified by subtractor 64 which has as one of its inputs the signal from line 62 while the other input is a signal from line 66. The comparison of the signals from lines 62 and 66 provide an effective error signal $e^*$ which appears on line 68 and is the effective error signal to which the feedback controller 24 responds.

The feedback controller 24 then produces a signal representing the manipulated variable $m_c$ on line 26 which signal is added to the signal from line 48 in the adder 28 in a manner similar to that shown in FIG. 1. As in FIG. 1, the signal from line 48 provides the feedforward control action which is derived by the use of a feedforward controller 70 shown in FIG. 2 as including the feedforward dynamics of block 32 similar to that shown in FIG. 1 which provide on an output line 36 a lagged rate signal responsive to changes in set point $r$ by way of the introduction of that set point signal as an input on line 34 to block 32. As in FIG. 1, the signal on line 36 is summed with the set point $r$ at the summer 38 and the output of that summer is then introduced as an input to multiplier 72 which multiplies the output of the summer by the factor $K_F$, representing the proportional gain of the feedforward control action. The output of the block 72 on line 74 is then the feedforward control action which is modified by multiplying it by a factor representing the reciprocal of the gain of the process model as shown in block 76. The result of that multiplication produces the signal $m_f$ which represents the feedforward control action applied to the process 10 by way of the summer 28 and line 12.

In FIG. 2 in order to decouple the feedback control action and the feedforward control action so that they may be separately tuned and so that there may be an avoidance of excessive control as is sometimes experienced in using both the feedforward and feedback control there is provided a non-linear process model 50 which has as its input the signal $m_f$ from line 80 and which produces on its output line 82 a signal representing the anticipated value for the controlled variable $c$ which should result from the effect of the feedforward control action $m_f$ on the process 10 so that the signal on line 82, by way of the circuitry later to be described, is effective to cancel or at least diminish by a predetermined amount the effect of the change in the signal appearing on line 16 as a result of the feedforward control action so that the effective error signal $e^*$ will not be affected by the feedforward control action or will be affected only to a diminished degree.

When the control system is in its steady state the set point signal r will be canceled by the signal c on line 16 so that the error signal e produced by subtractor 60 is zero. Under steady state conditions the signal on line 66 will be zero so that the effective error signal $e^*$ on line 68 is also zero. The value of the signal on line 66, when there is a change in the set point r, is obtained by multiplying the signal r by a gain factor $K_F$ in the multiplier 88. The signal from the output of the multiplier 88, on line 90, is transmitted through subtractor 92 and the multiplier 86, where it is multiplied by $\beta$, to line 66 so that it is introduced into subtractor 64 to cancel out or diminish the effect of any change of the signal r on the signal e. It will be evident that if the factors $K_F$ in blocks 88 and 72 are equal to one and if the value of $\beta$ in block 86 is equal to one, the operation of the circuitry of FIG. 2 will be similar to that of FIG. 1 with $K_F$ in block 44 equal to one.

Under some conditions it is desirable to use less than the full feedforward control action. For example, it may be desirable that the proportional gain of the feedforward control $K_F$ have a value of 0.7. When that is the case the changes which occur in the set point r will not be completely canceled by the signal on line 66. Instead, there will be introduced into the feedback controller 24 an effective error signal $e^*$ such as to cause the feedback controller to respond to three tenths of the change in the set point while the feedforward control action provides the response to the seven tenths.

As changes occur in the value of the controlled variable c due to the feedforward control action, those changes will introduce a variation into the error signal e on line 62 and it is necessary for the operation of this invention that those changes be canceled out by the signal on line 66. This is accomplished by the effect on the signal on line 66 of the output of the process model 50 in response to the feedforward control action represented by changes in the signal $m_f$. The signal on line 82 will vary as does c and thus if $\beta$ is one, the change in the signal on line 82 will result in a canceling of the change in the signal on line 16 due to feedforward control action. In the steady state situation the signal on line 82 will cancel the signal on line 90 in subtractor 92, thus the value of the signal on line 66 would be zero. Under those conditions the feedback controller 24 will maintain the controlled variable c at a value equal to the set point r.

If $\beta$ is less than one, then only a portion of the signal for canceling the effect on e appears on line 66 so that the decoupling of the feedforward and feedback control is diminished. If, for example, the value of $\beta$ is set to zero then the benefits of this invention are not being used.

It will be evident to those skilled in the art that the feedforward controller may provide a proportional action only, a rate action only or any desired combination of those control responses. Similarly, the process model may be a simplified model of the process such as will be adequate to produce the necessary degree of decoupling between the feedforward and feedback control actions.

The present invention is applicable to control systems in which a set point change and a change in the demand on the process may both occur. Such a system is shown in FIG. 3, wherein the demand change may be detected by the measurement of a system variable indicative of the demand on the process. In FIG. 3 the process may, for example, be a boiler-turbine system with the manipulated variable m being the firing rate of the boiler and the other manipulated variable of the process $m'$, the position of the throttle valve adjusting the flow of steam from the boiler to the turbine. The control of the manipulated variable $m'$ may be from another control system which may be controlling the output of the generator driven by the turbine. The value of $m'$ is indicative of the demand on the process. Thus, if c is a measure of boiler pressure it will be evident that $m'$ can be considered a demand signal for the control system modifying m since a change in steam flow due to a change in throttle valve opening will cause a pressure change which must eventually be compensated for by modifying the firing rate of the boiler.

In FIG. 3 the control system for modifying m is similar to that shown in FIG. 2 with the addition of a feedforward control of the manipulated variable m from the demand signal. To provide such a feedforward control action there is provided feedforward controller 100, having a transfer function $G_{FF}'$ for responding to the demand signal $m'$ on line 102 to provide an output on line 104 to summer 106 where it is summed with the feedforward control signal produced by feedforward controller 70 as modified by multiplier 76. The sum of the two feedforward signals produces the signal $m_f$ on line 108 for summing with the signal $m_c$ in summer 28, as in FIG. 2. The signal $m_f$ also appears on line 110 as one of the inputs to the process model 112, which is shown as having a transfer function $G_{PM}$. The other input to the process model 112 is by way of line 114 from line 102 and represents $m'$, the demand signal. The signal from line 114 serves to modify the process model 112 in the same way that the signal $m'$ modifies the process 95 itself. Thus, the process model 112 will model in non-linear fashion the relationship between m and c of process 95 as that relationship is modified by the effect of $m'$.

In FIG. 3 if the set point is a fixed value, then the feedforward controller 70 and the multiplier 76 are not necessary. Also, line 90 may also be omitted if a linearized model is used instead of the non-linear model 112.

Figure 4:
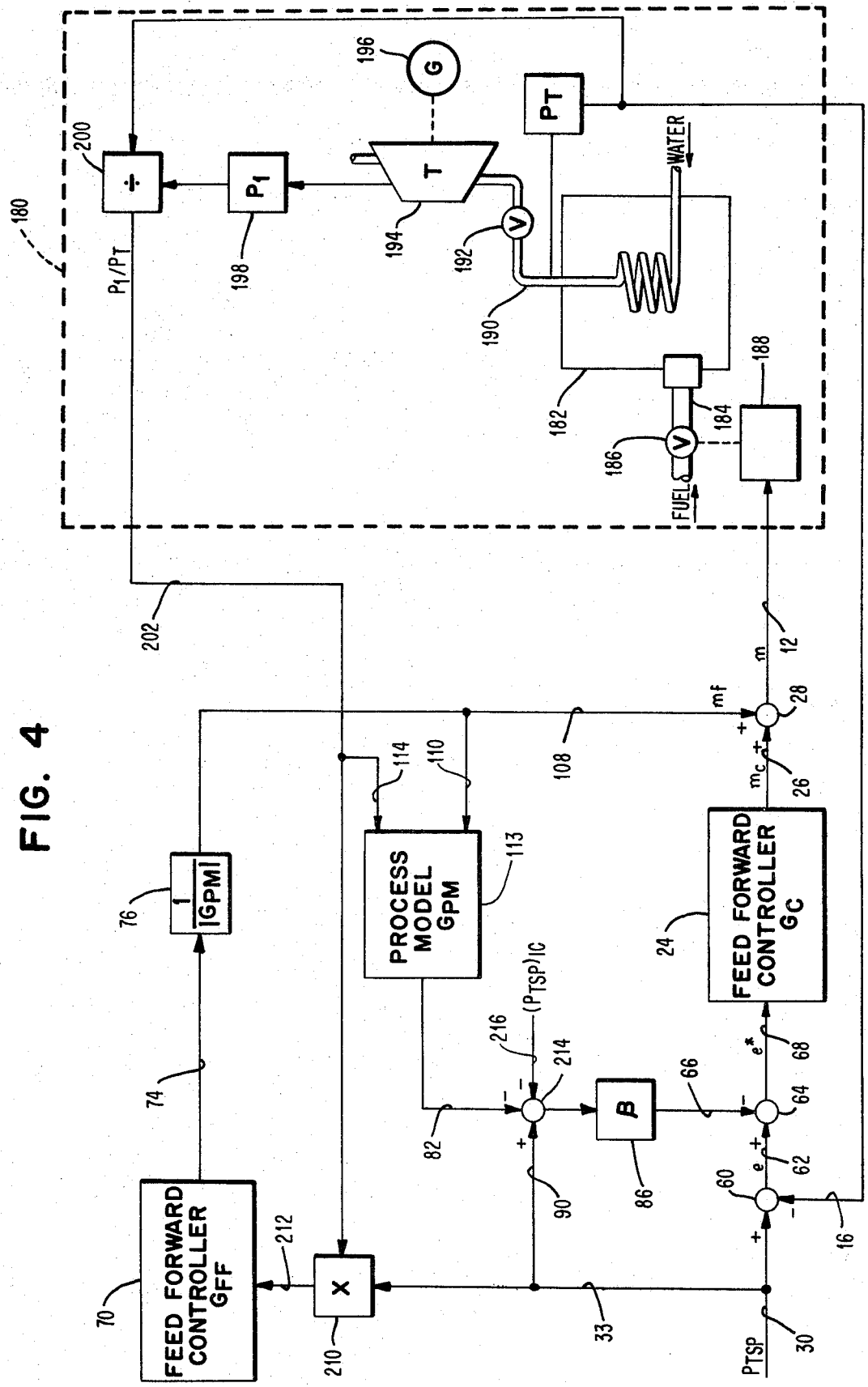
FIG. 4 is a block diagram of a feedforward-feedback control system as applied to a boiler-turbine control in which the throttle pressure is allowed to vary while the throttle valve position is controlled to a constant set point.

In FIG. 4 the process 180 is shown as including a steam boiler 182 whose fuel supply is provided by way of line 184 through valve 186. Valve 186 is under the control of valve positioner 188 so that the valve 186 is positioned in proportion to the magnitude of the input signal to positioner 188, namely, the magnitude of m on line 12. As shown, the boiler 182 produces steam on its output line 190 through throttle valve 192 to turbine 194. The turbine 194 in turn operates to drive the generator 196. In the process 180 the controlled variable $P_T$, representing the throttle pressure, is measured from steam line 190 to provide the signal on line 16. There is also a measurement made of the first stage pressure in turbine 194 by the pressure measuring device 198 to provide an indication of the first stage pressure, namely, $P_1$.

By dividing the value of $P_1$ by the value of $P_T$ in the divider 200, the ratio $P_1/P_T$ is produced on line 202 as an indication of the position of valve 192. The process 180 including boiler 182, may, for example, operate in a sliding pressure mode such as is described in U.S. Pat.

application, Ser. No. 217,484, filed Jan. 13, 1972, by our coworker T. W. Jenkins, Jr. As explained in that application, a single indication of the process demand may be obtained by multiplying the ratio $P_1/P_T$ by the throttle pressure set point $P_{TSP}$. It will be noted from the drawing of FIG. 4 that the set point is provided on line 30 and the product referred to is provided by the multiplier 210 so that the demand signal then appears on line 212 as a signal to feedforward controller 70. As further shown in FIG. 4 the output of the feedforward controller 70 is utilized in much the same way as in FIG. 3 with the output of the controller 70 being multiplied by the reciprocal of the gain of the process model with the resulting product providing one of the inputs to process model 113, namely, the input on line 110.

In FIG. 4 it is necessary to take into account the fact that the set point $P_{TSP}$ will be changing as indicated in the description of the variable pressure control system of the above mentioned Jenkins application. There is thus provided to line 90 a signal which will tend to cancel out the effect on the error $e$ of the set point changes so that the effective error $e^*$ will remain essentially unchanged as a result of changes in set point provided that the factor $\beta$ in the multiplier 86 is set to a value of 1.

The signal on line 202, which provides an input through line 114 to process model 113 is effective as its value changes to modify the output of the linearized process model on line 82 in addition to the effect on the output caused by the signal on line 110. The signal on line 82 represents a change in the value of the controlled variable $P_T$ and cannot normally be canceled by the signal on line 90 and thus it is necessary to introduce into the summer 214 a signal $(P_{TSP})_{IC}$ indicative of the initial condition for the value of the throttle pressure set point which is the value for the load for which the model 113 is designed.

It will thus be evident from FIG. 4 that a boiler-turbine system may be controlled in a sliding pressure mode utilizing feedforward control from a process demand signal in such a way that there is no interaction between the feedforward control and the feedback control when the control system is designed in accordance with the principles established herein and exemplified by the systems of FIGS. 1–3. Thus, the arrangement of FIG. 4 operates in a manner similar to that of FIG. 3, for example, with the exception that an external demand signal 202 is multiplied by the set point signal on line 33 to obtain a composite demand signal on line 212. In addition, the arrangement of FIG. 4 makes the assumption that the proportional gain $K_F$ is equal to 1 thus making it possible to omit block 88. Likewise, since the demand signal is established by multiplying the signal on line 202 by the set point from line 30 it is only necessary to have one feedforward controller 70 and hence the controller 100 of FIG. 3 can be omitted.

The arrangement of FIG. 4 for the control of a boiler-turbine system in a sliding pressure mode can be readily adapted by those skilled in the art to control a boiler-turbine system operated with a constant throttle pressure. The necessary modifications would include the omission of the line 90 as well as the line 216, thus making the summer 214 unnecessary. The line 33 could also be omitted along with multiplier 210 so that the signal on line 202 would provide the demand signal input through the feedforward controller 70.

In boiler control systems, the value $(P_1/P_T) P_{TSP}$ may as mentioned be used as a demand signal in a boiler control system. Likewise, $P_1/P_T$, desired generation or steam flow and other similar variables may be used as demand signals.

Figure 5:
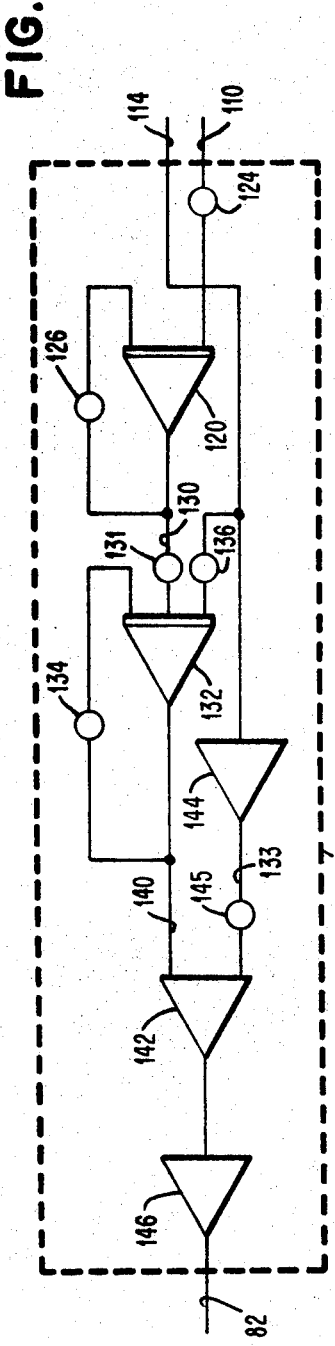
FIG. 5 is a circuit diagram in block form showing a form of process model for modeling a portion of a steam boiler.

The process model 113 may be a linearized model of a portion of a steam boiler, for example, and may utilize a circuit such as that shown in FIG. 5, which models the boiler firing dynamics and the boiler pressure dynamics. The model is essentially a series arrangement of two first order lags. The first of the two lags uses integrator 120 and the input from line 110. The input signal from line 110 first is adjusted by potentiometer 124 to give an appropriate input to the integrator 120 which has a potentiometer in its feedback path, namely, potentiometer 126, thus forming the initial first order lag. The output of the initial lag on line 130 is used as an input through potentiometer 131 to the second lag, made up of integrator 132 and the potentiometer 134 in its feedback circuit. Integrator 132 also has a second input from line 114 through potentiometer 136. The output of integrator 132 on line 140 is then summed with the signal on line 133 from the sign reversing operational amplifier 144 supplied through potentiometer 145. The output of amplifier 142 is then fed for sign reversal to amplifier 146 to provide an output on line 82.

Figure 6:
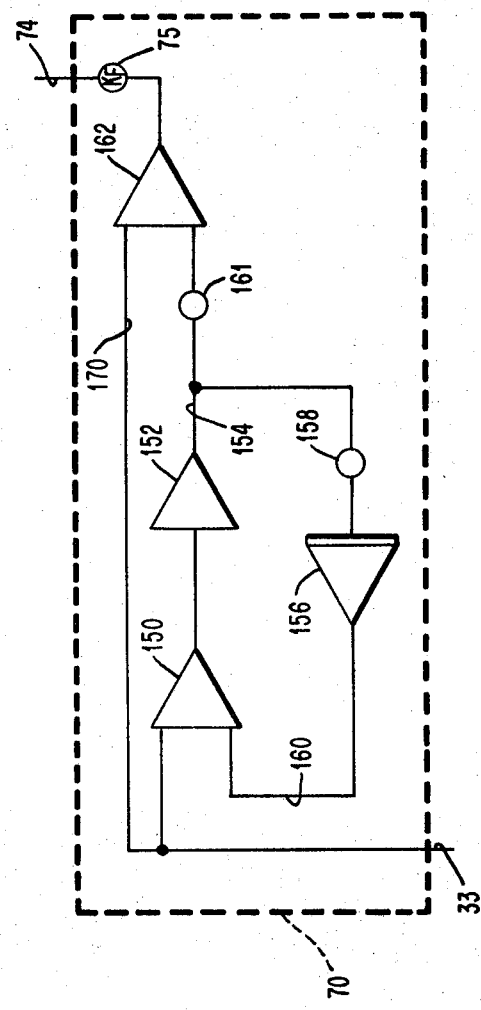
FIG. 6 is a circuit diagram in block form showing a feedforward controller providing both rate and proportional responses.

In FIG. 6 there is shown one circuit for providing the feedforward dynamics which make up the feedforward controller 70 (FIG. 2) which is similar to feedforward controller 100 (FIG. 3). The input to controller 70 is from line 33 to a circuit branch which includes operation amplifiers 150 and 152 connected serially. The output of 152 on line 154 is subjected to integration by integrating amplifier 156 after being passed through potentiometer 158 which adjusts the rate time for the feed-forward control. The result of the integration appears as a feedback to the input amplifier 150 on line 160. The output from line 154 is introduced as an input to the final summing amplifier 162 after passing through potentiometer 161 which adjusts the rate gain. The other input to amplifier 162 is by way of line 170 from line 33. Amplifier 162, of course, produces the output to line 74 after being multiplied by the proportional gain factor $K_F$, as by potentiometer 75 which substitutes for block 72 of FIG. 2.

In all of the previously mentioned control systems it has been assumed that the manipulated variable was subject to change without constraint. When, because of the limits in the travel of the valves or other operators which modify the manipulated variable there is in effect a constraint on changes in the manipulated variable it is necessary to modify the operation of the control system to take into account those constraints. The most advantageous approach for taking care of such constraints is to provide an arrangement for maintaining the input to the process model during the period of constraint at the value which existed when the manipulated variable reached a constraint and then allowing the process model to change whenever the manipulated variable can also change. There may thus be used in systems such as that of FIG. 2 a circuit in the line 80 for example, which may be referred to as a "track and hold" circuit, which will operate so as to allow the input to the process model 50 to track the signal $m_f$ on line 48 as long as the signal $m$ on line 12 can be followed by the manipulated variable of the process 10, but the circuit then operates to hold the input to the process model 50 at the value exists for the signal $m_f$ when the manipulated variable of the process 10 reaches a constraint, such as a high limit or a low limit. Similar track and hold circuits can be utilized in the systems described in the other figures so as to maintain the input to the process model which relates to the manipulation of a variable of the process at valve valuz existing when the manipulated variable reaches a constraint and to allow that input to vary under other conditions.

While the systems disclosed are analog in form it will be evident that the steps of the novel control could be carried out by using a programmed general purpose digital computer by using well known techniques for accomplishing direct digital computer control analogous to the analog control disclosed.

What is claimed is:

1. In a process control system having means for providing both feedback and feedforward control action to minimize the deviation of a controlled variable from its set point, the improvement which comprises:
means for modifying the effective error signal to which the feedback control action responds so as to cancel those changes of the effective error signal which will be corrected by the anticipated effect of the feedforward control action.

2. In a process control system having means for providing both feedback and feedforward control action to minimize the deviation of a controlled variable from its set point, the improvement whih comprises:
means for modifying the effective error signal to which the feedback control action responds so that the modification is effective to cancel that part of the effective error signal which will be corrected by the anticipated effect on the process of the feedforward control action.

3. In a process control system having means for providing both feedback and feedforward control action to minimize the deviation of a controlled variable from its set point, the improvement which comprises:
means for modifying the effective error signal to which the feedback control action responds so as to prevent a change in the effective error signal when the controlled variable changes due to feedforward control action.

4. In a process control system having means for providing both feedback and feedforward control action to minimize the deviation of a controlled variable from its set point, the improvement which comprises:
means for modifying the effective error signal to which the feedback control action responds so as to prevent a change in the effective error signal in response to the feedforward portion of that signal to which the feedforward control action responds.

5. In a process control system having means for providing both feedback and feedforward control action to minimize the deviation of a controlled variable from its set point, the improvement which comprises:
means for modifying the effective error signal to which the feedback control action responds so as to change the effective error signal by an amount substantially equal and opposite to the change in the effective error signal anticipated as a result of the effect on the process of the feedforward control action.

6. In a process control system having means for providing both feedback and feedforward control action to minimize the deviation of a controled variable from its set point, the improvement which comprises:
means for modifying the effective error signal to which the feedback control action responds so as to minimize the chance in the effective error signal in response to a change in set point, when that change in set point initiates feedforward control action.

7. In a process control system having means for providing both feedback and feedforward control action to minimize the deviation of a controlled variable from its set point, the improvement which comprises:
means for modifying the effective error signal to which the feedback control action responds so as to minimize the change in the effective error signal resulting from a change in the controlled variable due to feedforward control action from a change in process demand.

8. A process control system for modifying a manipulated variable of the process so as to reduce the deviation of the controlled variable from its set point comprising:
feedback control means responsive to the difference between the controlled variable and the set point to modify the manipulated variable until said controlled variable corresponds with said set point,
feedforward control means responsive to changes in the value of a process quantity indicative of a change in the process demand and operable to modify the manipulated variable as a function of the magnitude of the change of said quantity, said modification being in direction to minimize the deviation of the controlled variable from the set point, and
model means representing said process and operative to respond to said feedforward control of said manipulated variable to modify said difference between the controlled variable and the set point so as to modify the effective error signal to which said feedback control means is responsive to cancel that change in the effective error signal which will be corrected by the anticipated effect on the controlled variable of the action of the feedforward control means.

9. A process control system as set forth in claim 8 in which the function is proportional to the magnitude of the change.

10. A process control system as set forth in claim 8 in which the function is the sum of a proportional and a rate response to said magnitude of the change in the process quantity.

11. A boiler-turbine control system for modifying the firing rate to the boiler so as to reduce the deviation of the throttle pressure from its set point comprising:
feedback control means responsive to the difference between the measured throttle pressure and its set point to modify the firing rate until said throttle pressure corresponds with said set point,
feedforward control means responsive to changes in the value of a demand quantity and operable to modify the boiler firing rate as a function of the value of said demand quantity, said modification being in direction to minimize the deviation of the controlled variable from the set point, and model means representing at least a part of said process and operative to respond to said feedforward control of said firing rate to modify said difference between the throttle pressure and its set point so as to modify the effective error signal to which said feedback control means is responsive so as to cancel that change in the effective error signal expected due to the effect on the throttle pressure of the action of the feedforward control means.

12. A boiler-turbine control system for modifying the firing rate to the boiler so as to reduce the deviation of the throttle pressure from its set point while changing the set point to maintain the desired output from a generator driven by the turbine comprising:

feedback control means responsive to the difference between the measured throttle pressure and its set point to modify the firing rate until said throttle pressure corresponds with said set point, feedforward control means responsive to changes in the value of a demand quantity and operable to modify the boiler firing rate in proportion to the rate of change of said set point in anticipation of the expected change in the value of the measured throttle pressure due to the change in said firing rate, said modification being in direction to minimize the deviation of the controlled variable from the set point, and model means representing said process and operative to respond to said feedforward control of said firing rate to modify said difference between the throttle pressure and its set point so as to modify the effective error signal to which said feedback control means is responsive so as to cancel that change in the effective error signal expected due to the effect on the throttle pressure of the action of the feedforward control means.

13. A process control system comprising:

a feedback controller operable to modify a manipulated variable of said process in response to an effective error signal to reduce said effective error signal to zero, a feedforward controller operable to modify said manipulated variable in response to change in a demand signal, and process model means responsive to the modification of the manipulated variable due to action of said feedforward controller for producing a signal for modifying said effective error signal so as to reduce the effect on said effective error signal of changes in the controlled variable resulting from action of the feedforward controller in response to changes in said demand signal.

14. A process control system comprising:

a feedback controller operable to modify a manipulated variable of said process in response to an effective error signal to reduce said effective error signal to zero, a feedforward controller operable to modify said manipulated variable in response to the change in a set point signal representative of the desired value for a controller variable, process model means responsive to the modification of the manipulated variable due to action of said feedforward controller for producing a first signal for modifying said effective error signal so as to reduce the effect on said effective error signal of changes in the controlled variable resulting from action of the feedforward controller in response to changes in said set point, and means for producing a second signal for modifying said effective error signal in accordance with said set point signal as modified by a factor representative of the proportional gain of the feedforward controller so as to reduce the effect on said effective error signal of changes in said set point.

15. The method of controlling a variable of a process to a set point comprising the steps of:

automatically modifying by feedback control action a manipulated variable of the process in direction and extent to reduce the effective error between the controlled variable and the set point to zero, automatically modifying by feedforward control action the manipulated variable of the process in accordance with the magnitude of the change of a process condition, and automatically modifying said effective error signal so as to prevent a change in the effective error signal due to feedforward control action.

16. The method of claim 15 in which the process condition is the set point.

17. The method of claim 15 in which the process condition is a demand signal.

18. The method of controlling a variable of a process to a set point comprising the steps of:

automatically modifying by feedback control action a manipulated variable of the process in direction and extent to reduce the effective error between the controlled variable and the set point to zero, automatically modifying by feedforward control action the manipulated variable of the process in accordance with a function of the change of a process condition, and automatically modifying said effective error signal so as to prevent in the effective error signal when the controlled variable changes due to feedforward control action.

19. The method of claim 18 in which the function is proportional to the magnitude of the change in the process condition.

20. The method of claim 18 in which the function is the sum of a proportional and a rate response to said magnitude of the change in the process condition.

21. The method of controlling a variable of a process to a set point comprising the steps of:

automatically modifying by feedback control action a manipulated variable of the process in direction and extent to reduce the effective error between the controlled variable and the set point to zero, automatically modifying by feedforward control action the manipulated variable of the process in accordance with a function of the change of a process condition, and automatically modifying said effective error signal so as to cancel a predetermined part of the change in the effective error signal in response to a change in the controlled variable due to feedforward control action.

* * * * *

UNITED STATES PATENT OFFICE
CERTIFICATE OF CORRECTION

Patent No. 3,758,762  Dated September 11, 1973

Inventor(s) Bernard Littman and Charles W. Ross

It is certified that error appears in the above-identified patent and that said Letters Patent are hereby corrected as shown below:

Column 4, line 20, delete "and" (first occurrence).

Column 9, line 2, after "value" insert --which--.

Column 9, line 8, "valve valuz" should read --the value--.

Column 9, line 31, "whih" should read --which--.

Column 10, line 7, "chance" should read --change--.

Column 12, line 40, after "prevent" insert --a change--.

Signed and sealed this 16th day of July 1974.

(SEAL)
Attest:

McCOY M. GIBSON, JR.
Attesting Officer

C. MARSHALL DANN
Commissioner of Patents